(12) United States Patent
Luo et al.

(10) Patent No.: US 8,593,933 B2
(45) Date of Patent: Nov. 26, 2013

(54) MODIFIED SPATIAL DIVERSITY SCHEMES FOR COVERAGE ENHANCEMENT

(75) Inventors: Tao Luo, San Diego, CA (US); Kapil Bhattad, San Diego, CA (US); Xiaoxia Zhang, San Diego, CA (US); Taesang Yoo, San Diego, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 13/094,669

(22) Filed: Apr. 26, 2011

(65) Prior Publication Data

US 2011/0261673 A1    Oct. 27, 2011

Related U.S. Application Data

(60) Provisional application No. 61/328,535, filed on Apr. 27, 2010.

(51) Int. Cl.
*H04J 9/00* (2006.01)

(52) U.S. Cl.
USPC .......................................... 370/204; 370/328

(58) Field of Classification Search
USPC ......... 370/201, 203, 204, 328, 329, 330, 338, 370/465
See application file for complete search history.

(56) References Cited

U.S. PATENT DOCUMENTS

| | | | | |
|---|---|---|---|---|
| 5,740,208 A | * | 4/1998 | Hulbert et al. | 375/346 |
| 7,154,936 B2 | * | 12/2006 | Bjerke et al. | 375/148 |
| 7,453,966 B2 | * | 11/2008 | Tang et al. | 375/348 |
| 7,633,850 B2 | * | 12/2009 | Ahn | 370/208 |
| 8,064,837 B2 | | 11/2011 | Sampath | |
| 8,139,548 B2 | * | 3/2012 | Park et al. | 370/336 |
| 8,228,809 B1 | * | 7/2012 | Xing et al. | 370/252 |
| 2005/0075073 A1 | | 4/2005 | Kadous et al. | |
| 2005/0164658 A1 | | 7/2005 | Oh et al. | |
| 2011/0201357 A1 | * | 8/2011 | Garrett et al. | 455/456.2 |
| 2011/0249602 A1 | * | 10/2011 | Wennstrom et al. | 370/310 |
| 2011/0293037 A1 | * | 12/2011 | Liu et al. | 375/295 |

OTHER PUBLICATIONS

"3rd Generation Partnership Project;Technical Specification Group Radio Access Network; Evolved UTRA and UTRAN;Radio Access Architecture and Interfaces (Release 7)" 3GPP Draft; TR_R3018_V_100, 3rd Generation Partnership Project (3GPP), Mobile Competence Centre; 650, Route Des Lucioles; F-06921 Sophia-Antipolis Cedex; France, vol. RAN WG3, Oct. 12, 2007, XP050143278 paragraph [6.12.5.1]-paragraph [6.12.5.3.5] figures 6.12.5.3.5-1.

(Continued)

*Primary Examiner* — Ricky Ngo
*Assistant Examiner* — Christine Ng
(74) *Attorney, Agent, or Firm* — Dalei Dong (57) ABSTRACT

In one aspect, a method to enhance coverage in a heterogeneous wireless network wireless communication is disclosed. The method includes generating a reference signal indicating a plurality of transmit antenna ports and generating modulation symbols. Modulation symbols are assigned to each of the plurality of transmit antenna ports, in accordance with a spatial diversity coding scheme for the plurality of transmit antenna ports. At least one of the modulation symbols assigned to at least one of the plurality of transmit antenna ports is muted prior to transmission in accordance with the spatial diversity coding scheme. The non-muted modulation symbols and the reference signal are transmitted on the other of the plurality of transmit antenna ports.

20 Claims, 6 Drawing Sheets

(56) References Cited

OTHER PUBLICATIONS

Catt: "Technology Aspects for Heterogeneous Networks", 3GPP Draft; R1-100901, 3rd Generation Partnership Project (3GPP), Mobile Competence Centre; 650, Route Des Lucioles; F-06921 Sophia-Antipolis Cedex; France, vol. RAN WG1, No. San Francisco, USA; Feb. 22, 2010, Feb. 16, 2010, XP050418503, [retrieved on Feb. 16, 2010].
Huawei: "LTE non-CA based HetNet support", 3GPP Draft; R1-101982, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 4, 2010, XP050419319, [retrieved on Apr. 6, 2010].
International Search Report and Written Opinion—PCT/US2011/034123—ISA/EPO—Nov. 4, 2011.
NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; 20100412, Apr. 7, 2010, XP050419698, [retrieved on Apr. 7, 2010].
Partial International Search Report—PCT/US2011/034123, ISA/EPO—Aug. 16, 2011.
Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Feb. 22, 2010, Feb. 16, 2010, XP050418951, [retrieved on Feb. 16, 2010].
RAN WG1: "LS answer to R3-060085 (=R1-060004) on RRM for LTE", 3GPP Draft; R3-060358 R1-060719, 3rd Generation Partnership Project (3GPP), Mobile Competence Centre; 650, Route Des Lucioles; F-06921 Sophia-Antipolis Cedex; France, vol. RAN WG3, No. Denver, USA; Feb. 20, 2006, Feb. 20, 2006, XP050159287, [retrieved on Feb. 20, 2006].

* cited by examiner

MODIFIED SPATIAL DIVERSITY SCHEMES FOR COVERAGE ENHANCEMENT

CROSS-REFERENCE TO RELATED APPLICATION

This application claims the benefit under 35 U.S.C. §119(e) to U.S. Provisional Patent Application No. 61/328,535 entitled MODIFIED SPATIAL DIVERSITY SCHEMES FOR COVERAGE ENHANCEMENT, filed on Apr. 27, 2010, the disclosure of which is expressly incorporated by reference herein in its entirety.

BACKGROUND

1. Field

Aspects of the present disclosure relate generally to wireless communication systems, and more particularly to modified spatial diversity schemes for coverage enhancement.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method to enhance coverage in a heterogeneous wireless network wireless communication is disclosed. The method includes generating a reference signal indicating a plurality of transmit antenna ports and generating modulation symbols. Modulation symbols are assigned to each of the plurality of transmit antenna ports, in accordance with a spatial diversity coding scheme for the plurality of transmit antenna ports. At least one of the modulation symbols assigned to at least one of the plurality of transmit antenna ports is muted prior to transmission in accordance with the spatial diversity coding scheme. The non-muted modulation symbols and the reference signal are transmitted on the other of the plurality of transmit antenna ports.

In another aspect, a method for cancelling an interfering signal from an interfering eNodeB is disclosed. The method includes receiving an indication that a spatial diversity transmission scheme for the interfering eNodeB is modified. The modulation symbols corresponding to the modified spatial diversity transmission scheme are regenerated. The interfering signal transmitted by the interfering eNodeB is cancelled using the regenerated modulation symbols and a channel estimate obtained from data and RS tones based on the modified spatial diversity scheme.

Another aspect discloses a method of wireless communication including receiving signaling indicating a spatial diversity transmission scheme for an interfering eNodeB is modified. The receiver demodulation and interference estimation of a user equipment (UE) is adjusted according to the modified spatial diversity transmission scheme. The method also includes decoding based on the signaling.

In another aspect, a method of wireless communication is disclosed that includes cancelling a signal corresponding to a spatial transmit diversity scheme. The cancelling includes iteratively estimating a first antenna port signal based on a received signal minus previous estimates of a other antenna port signals.

Another aspect discloses an aspect for wireless communication having a memory and at least one processor coupled to the memory. The processor(s) is configured to generate a reference signal indicating a plurality of transmit antenna ports and to generate modulation symbols. The processor is also configured to assign the modulation symbols to each of the plurality of transmit antenna ports, in accordance with a spatial diversity coding scheme for the plurality of transmit antenna ports. The processor is configured to mute at least one of the modulation symbols assigned to at least one of the plurality of transmit antenna ports prior to transmission in accordance with the spatial diversity coding scheme and to transmit non-muted modulation symbols and the reference signal on the other of the plurality of transmit antenna ports.

In another aspect, an apparatus for cancelling an interfering signal from an interfering eNodeB is disclosed. The apparatus includes a memory and at least one processor coupled to the memory. The processor is configured to receive an indication that a spatial diversity transmission scheme for the interfering eNodeB is modified. The processor is further configured to regenerate the modulation symbols corresponding to the modified spatial diversity transmission scheme. Additionally, the processor is configured to cancel the interfering signal transmitted by the interfering eNodeB using the regenerated modulation symbols and a channel estimate obtained from data and RS tones based on the modified spatial diversity scheme.

Another aspect discloses an apparatus for wireless communication and includes a memory and at least one processor coupled to the memory. The processor(s) is configured to receive signaling indicating a spatial diversity transmission scheme for an interfering eNodeB is modified. The processor is also configured to adjust receiver demodulation and interference estimation of a user equipment (UE) according to the modified spatial diversity transmission scheme and to decode based on the signaling.

In another aspect, an apparatus for wireless communication is disclosed and includes a memory and at least one processor coupled to the memory. The processor is configured to cancel a signal corresponding to a spatial transmit diversity scheme in which the processor is configured to iteratively estimate a first antenna port signal based on a received signal minus previous estimates of a other antenna port signals.

In another aspect, a computer program product for wireless communication in a wireless network is disclosed. The program code includes program code to generate a reference signal indicating a plurality of transmit antenna ports and program code to generate modulation symbols. Program code to assign the modulation symbols to each of the plurality of transmit antenna ports, in accordance with a spatial diversity coding scheme for the plurality of transmit antenna ports is also included. Further, program code to mute at least one of the modulation symbols assigned to at least one of the plurality of transmit antenna ports prior to transmission in accordance with the spatial diversity coding scheme and program code to transmit non-muted modulation symbols and the reference signal on the other of the plurality of transmit antenna ports are included.

Another aspect discloses an apparatus for wireless communication including means for generating a reference signal indicating a plurality of transmit antenna ports and means for generating modulation symbols. A means for assigning the modulation symbols to each of the plurality of transmit antenna ports, in accordance with a spatial diversity coding scheme for the plurality of transmit antenna ports is also included. The apparatus further includes means for muting at least one of the modulation symbols assigned to at least one of the plurality of transmit antenna ports prior to transmission in accordance with the spatial diversity coding scheme and means for transmitting non-muted modulation symbols and the reference signal on the other of the plurality of transmit antenna ports.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
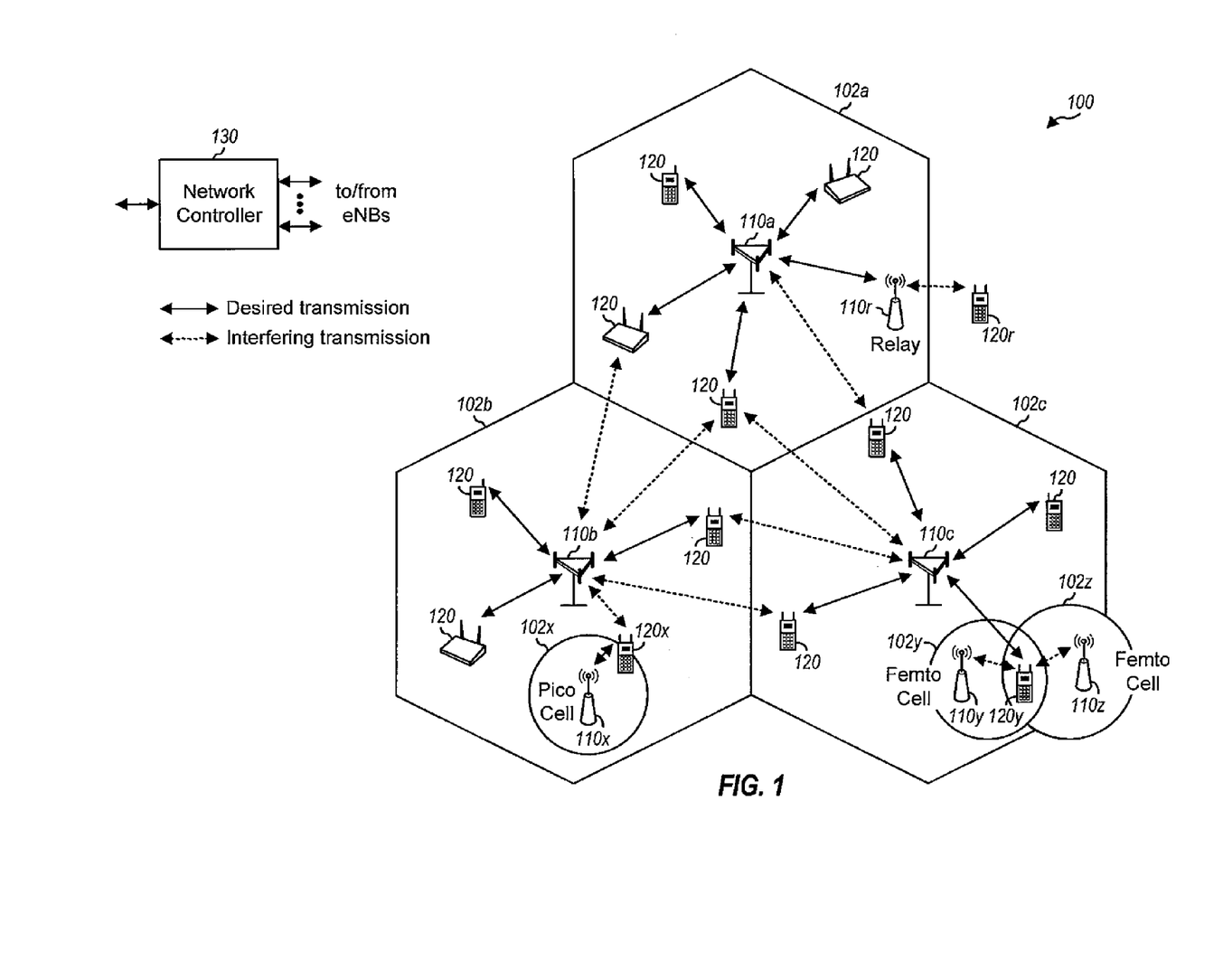
FIG. 1 is a block diagram conceptually illustrating an example of a telecommunications system.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, tablet or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.4, 3, 5, 10 or 20 MHz, respectively.

Figure 2:
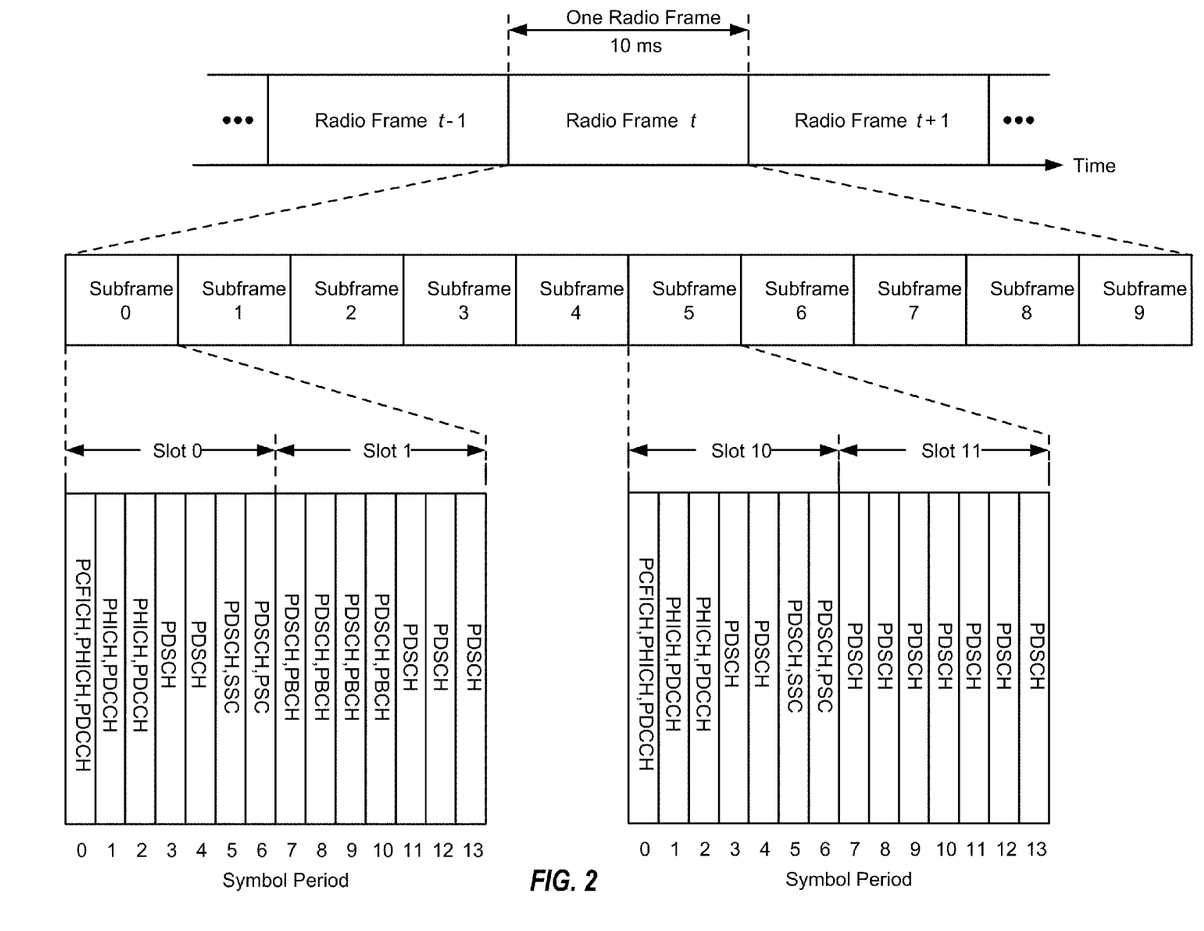
FIG. 2 is a diagram conceptually illustrating an example of a downlink frame structure in a telecommunications system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
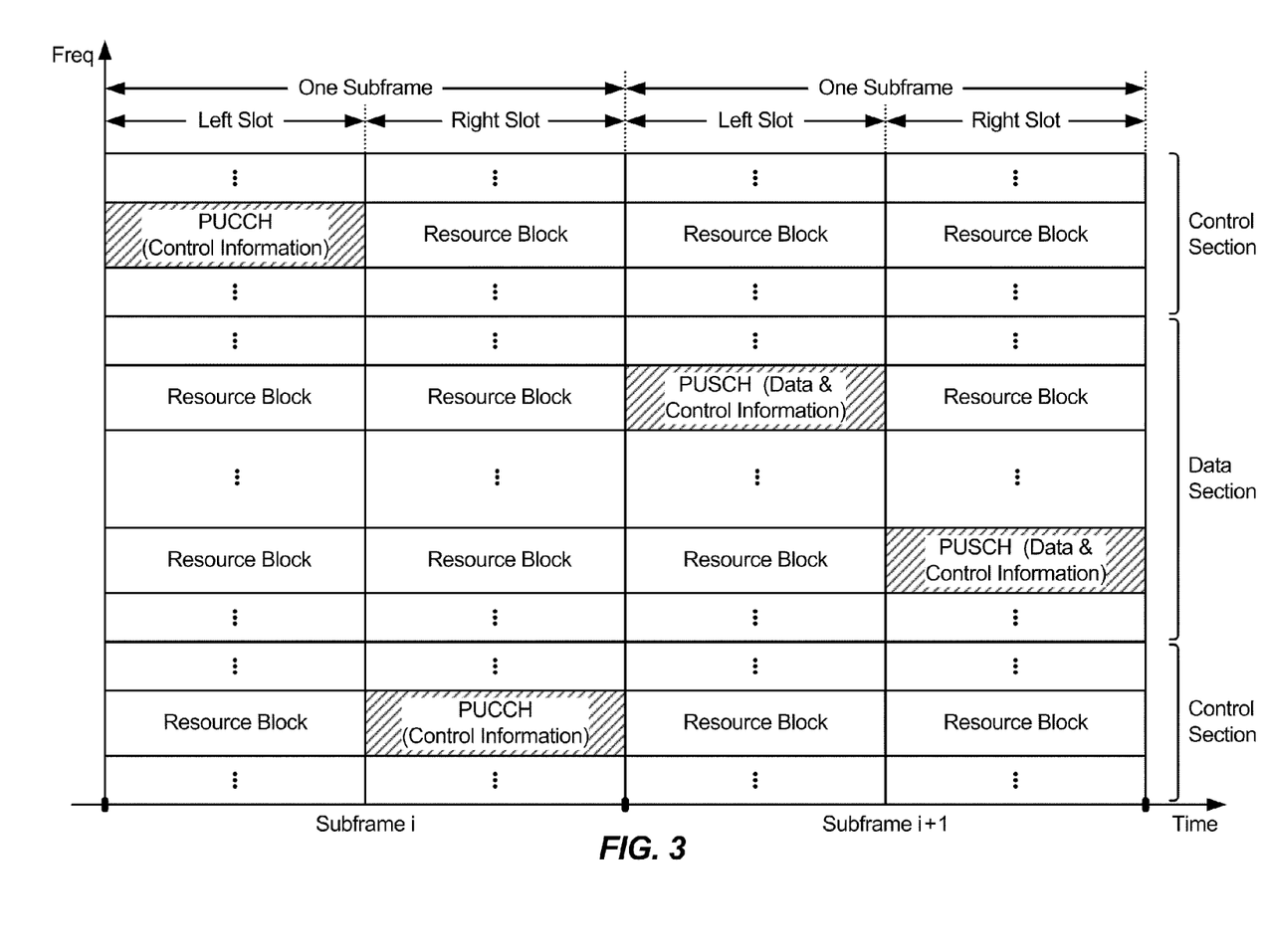
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
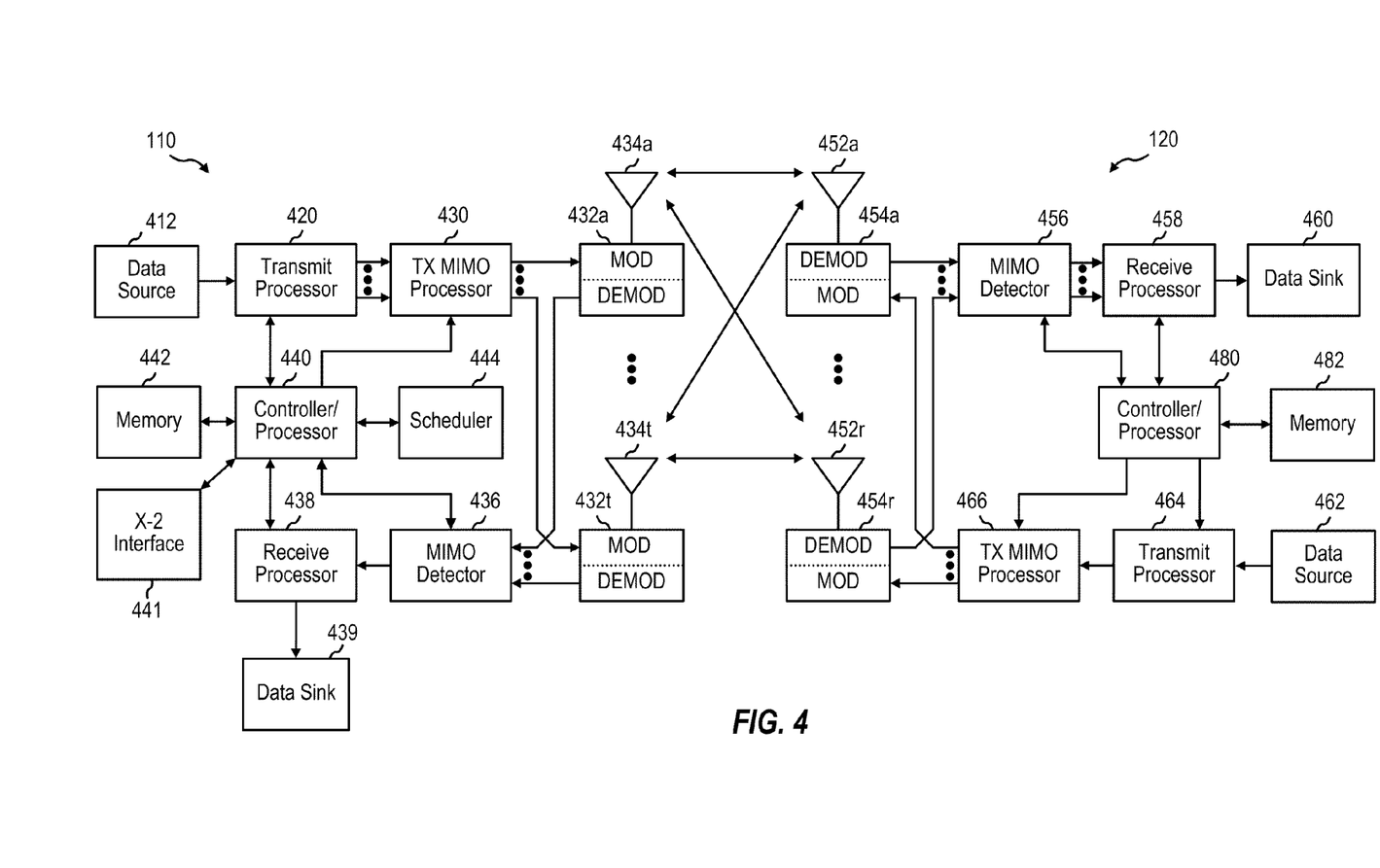
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

Figure 6:
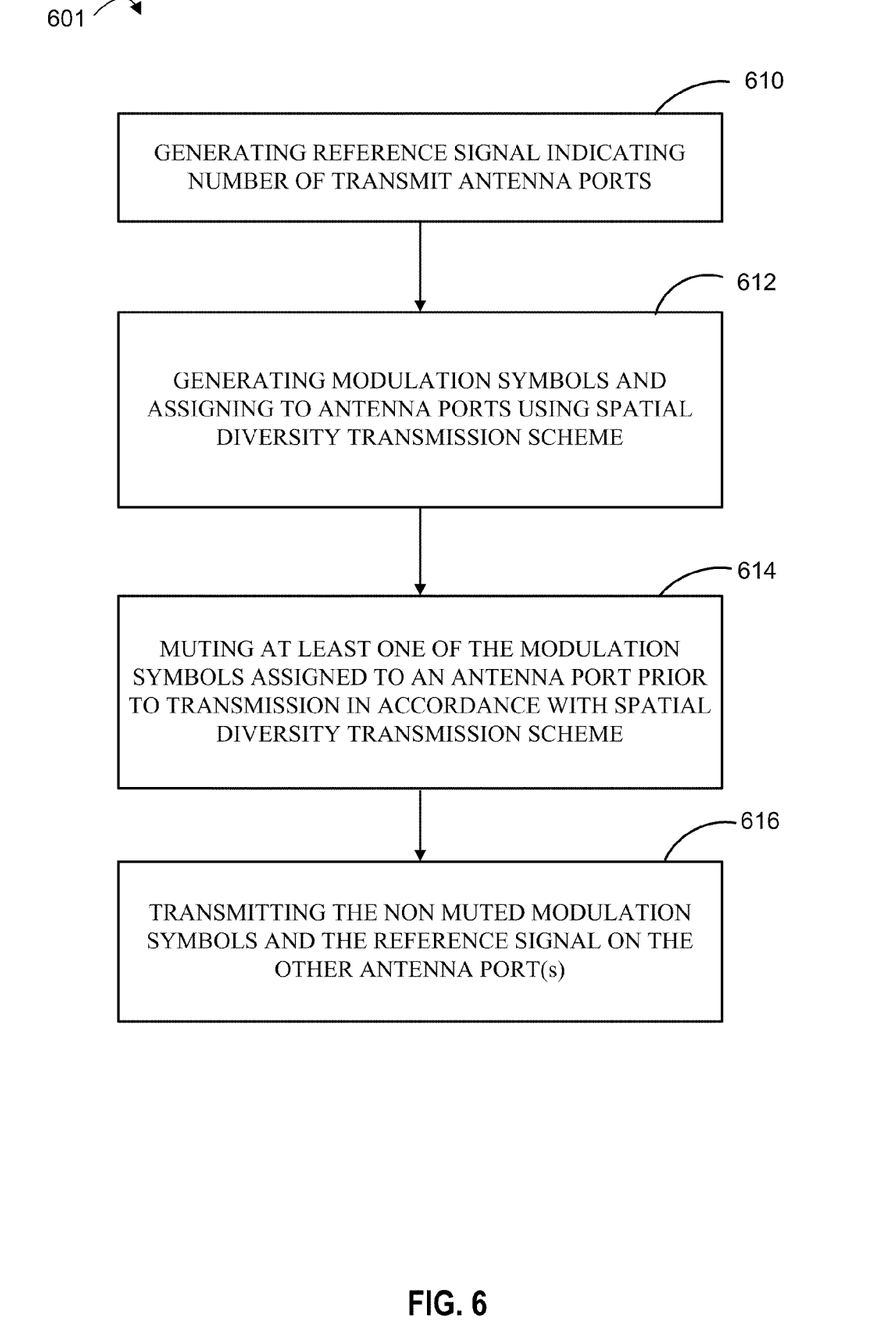
FIG. 6 is a block diagram illustrating methods for improving spatial diversity.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 6A and 6B, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
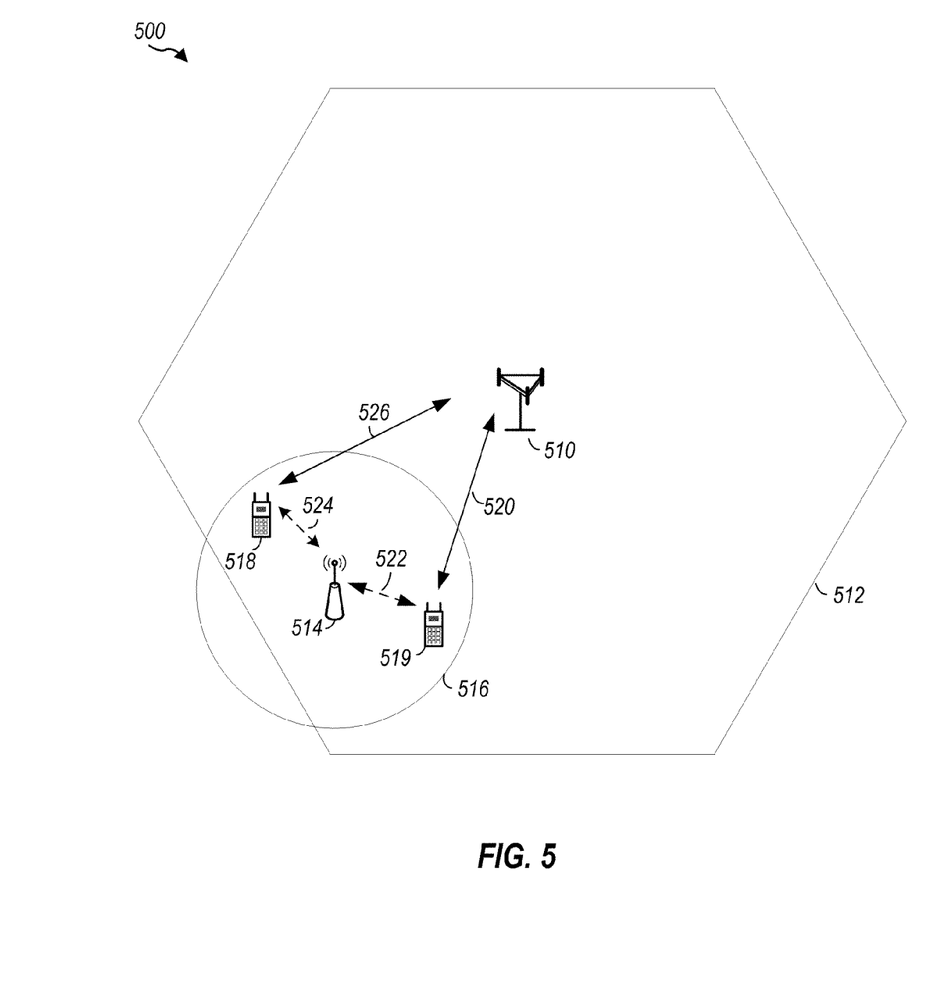
FIG. 5 is a block diagram illustrating a wireless communication system configured according to one aspect of the present disclosure.

FIG. 5 is a block diagram conceptually illustrating a wireless communication system 500 configured according to one aspect of the present disclosure. The wireless communication system 500 includes a macro cell 512 served by the serving base station (i.e., eNodeB 510). Overlaid on the macro cell 512 is a femto cell 516 served by the femto eNodeB 514. The femto cell 516 maintains a closed subscriber group (CSG), meaning the femto cell 516 is closed to all UEs except for those UEs having permission to use the femto cell 516 by participating in communication with the femto eNodeB 514. Two UEs, UEs 518 and 519, are in communication with the eNodeB 510, but are also located within the femto cell 516. In one scenario, neither the UE 518 nor the UE 519 are authorized into the CSG of the femto cell 516. Therefore, in maintaining connections 520 and 526, respectively, with the eNodeB 510, the UEs 518 and 519 experience interference from interfering signals 522 and 524, respectively, transmitted by the femto eNodeB 514. In order to counteract the strong interference from the femto eNodeB 514, the UEs 518 and 519 will attempt to cancel the interfering signals 522 and 524.

In order to increase its bandwidth and service of its member UEs, the femto eNodeB 514 transmits using two transmission antenna ports. In wireless communication systems, such as the wireless communication system 500, the use of multiple antenna ports at both the transmitter and receiver to improve communication performance is referred to as multiple-input and multiple-output, or MIMO. In some scenarios, MIMO technology may provide significant increases in data throughput and link range without consuming additional bandwidth or transmit power. This may be achieved through higher spectral efficiency and link reliability or diversity. One of several techniques to increase diversity is through the use of various Alamouti codes, such as a space-frequency block code (SFBC) and a space-time block code (STBC). The SFBC/STBCs are designed such that the transmitted diversity streams are orthogonal, which allows a higher signal-to-noise ratio (SNR). However, while this transmission scheme, which uses multiple transmit antenna ports with SFBC/STBC coding, is beneficial to service within the femto cell 516 for the member UEs, the multiple transmit antenna ports may also impact the signal cancellation performance of the UEs 518 and 519.

The signal cancellation performance degradation for interfering signals transmitted from multi-transmit antenna ports is much greater than the performance degradation when the interfering signal is transmitted on a single transmit antenna port. Each eNodeB in a particular system transmits an advertisement identifying the number of transmit antenna ports it is using. This information is generally transmitted on the physical broadcast channel (PBCH).

UEs compatible with advanced LTE (LTE-A) systems are broadly capable of actively coordinating cancellation of inter-cell interference. This technique, known as inter-cell interference coordination (ICIC), involves resource coordination amongst interfering base-stations, where an interfering base-station gives up use of some resources in order to enable control and data transmissions to the victim user terminal More generally, interfering base-stations can coordinate on transmission powers and/or spatial beams with each other in order to enable control and data transmissions to their corresponding user terminals. In still other implementations of ICIC, information regarding the interfering signals may be given directly to the UEs, such that the UEs may be better able to cancel the interfering signals. However, the ICIC techniques involve participation of advanced UEs, such as the UE 519, and may be incompatible with the older UEs, such as the UE 518. The wireless communication system 500, therefore, is configured to provide greater interference coordination by modifying the spatial diversity schemes in such a manner that the advanced UEs, such as the UE 519, may address the interference cancellation of the interfering signal 522 without any performance degradation, at the same time that the legacy UEs, such as the UE 518, may still be able to decode the spatial diversity scheme but with a little performance degradation.

In one aspect, the femto eNodeB 514 generates a reference signal advertising its number of transmit antenna ports. In one example, the reference signal is a common reference signal (CRS). The femto eNodeB 514 also generates modulation symbols and assigns them to the antenna ports in accordance with a spatial diversity coding scheme for the indicated number of antenna ports. In one example, the spatial diversity coding scheme is SFBC (space frequency block code) when the number of antenna ports is two and is SFBC-FSTD (space frequency block code-frequency shift time diversity) when the number of antenna ports is four.

When the femto eNodeB 514 detects the UEs 518 and 519, the femto eNodeB 514 modifies its spatial diversity coding scheme, (e.g., SFBC/SFBC-FSTD), to continue advertising transmission using two or four transmit antenna ports to legacy UEs, such as UE 518, and to improve performance of LTE-A UEs such as UE 519. In one aspect, the femto eNodeB may elect to perform this modification only when the femto eNodeB 514 detects the LTE-A UEs, such as UE 519, or when the femto eNodeB 514 detects no legacy UEs. The femto eNodeB 514 processes the SFBC/SFBC-FSTD coding in the same manner as it would for transmission using two or four transmit antenna ports. However, just prior to transmission of the spatial diversity coding, the femto eNodeB 514 mutes or zeroes out the tones carrying data, (i.e., the non-reference signal tones), for some of the antenna ports. For example, in systems with two CRS antenna ports, the eNodeB may mute one of its two antenna port outputs on all data resource elements allocated to a particular transmission (such as transmission of PBCH). In another example, the eNodeB may mute one antenna port on all data resource elements allocated in one set of resource blocks and the second antenna port on the remaining set of resource blocks. Therefore, the transmitted SFBC/SFBC-FSTD coding signal has a structure similar to a single transmit antenna, yet still maintains the same information as if the diversity coding were still for two transmit antennas.

The UE 518 receives the transmitted signal, is unaware of the modification and continues to decode the scheme as before and may have some performance loss. However, for channels like PBCH which are designed to be decoded at very low SNRs the performance degradation may lead to very little overall system impact. The UE 519, having more advanced interference cancellation capabilities, already knows the SFBC/SFBC-FSTD transmission is modified and is able to adjust its receiver modulation scheme in order to account for the adjusted transmission, allowing for signal cancellation to occur without any appreciable performance degradation.

In an alternative aspect of the present disclosure, the femto eNodeB 514 is equipped with four transmit antenna ports. After preparing the spatial diversity transmission as normal for four transmit antenna ports, the femto eNodeB 514 mutes or zeros out the antenna port outputs for three of the four transmit antenna ports. Thus, the transmitted spatial diversity transmission will have a payload that is similar to a spatial diversity transmission actually transmitted over four transmit antenna ports. With three of the four antenna ports nullified prior to transmission, there will be less of a performance degradation in the signal cancellation process for the UEs 518 and 519 as there would be if the four transmit antenna port each transmitted regular output.

In another aspect of the four-transmit antenna port scenario, the four-transmit antenna ports transmit by rotating the four transmit antenna port output over two antenna ports. In this aspect, after preparing the spatial diversity transmission as normal for four transmit antenna ports, one of the two transmit antenna ports is nulled on the first transmission and when the signal is rotated to the next two transmit antenna ports, one is nulled there as well before transmission. In this additional aspect, the transmitted spatial diversity transmission has a payload similar to the payload produced for a four-transmit antenna port system, but the signal reflects the output of two of the antenna ports.

In another aspect, a muting pattern may be defined for SFBC and/or SFBC-FSTD, where two resource elements form a SFBC group, and four data resource elements form an SFBC-FSTD group. The muting pattern may define resource element and antenna port combinations whose corresponding modulation symbols are muted. In one example, with either two or four antenna ports, the muting pattern varies across time and/or across frequency (i.e., across different SFBC/SFBC-FSTD groups). In another example, the muting pattern can be the same for all of the SFBC/SFBC-FSTD groups in a resource block but may vary across other resource blocks and across subframes. That is, a muted resource block(s) can vary across time and/or frequency, resulting in transmit diversity. For example, antenna port one may be muted on resource block one, and antenna port zero may be muted on resource block two. Thus, the UE receives signals from both antenna port 0 and antenna port 1 and both resource block one and resource block two are considered, as opposed to the case when the same antenna port is muted on both the resource blocks. In one aspect, the eNodeB signals to the UE the muting pattern. In another aspect, the UE is already aware of the muting pattern, which is standardized.

In another aspect, the power of the muted modulation symbols is applied to power boost the non-muted modulation symbols or other data symbols. In one example, the power boost is applied to only non-muted modulation symbols on the same OFDM symbol as the muted modulation symbols of the same antenna port.

It should be noted that depending on the application of the various aspects of the present disclosure, the modified spatial diversity transmission scheme may be for the physical broadcast channel (PBCH), or any other broadcast, data, or control channel, such as, for example, the physical downlink shared channel (PDSCH), or the like.

The cancellation of the interfering signal may be implemented using various methods. Various iterative channel estimations for SFBC/FSTD (space frequency block code/frequency shift time diversity) may further improve performance. One example illustrates a receiver where the PBCHs of multiple cells overlap and the UE attempts to decode the PBCH by cancelling the PBCH of stronger cells. The PBCH employs an SFBC/SFBC-FSTD scheme. To perform the cancellation, the UE decodes the PBCH using a channel estimated from the reference signal and then estimates the channel from the decoded data to get a more accurate estimate of the channel. The UE may then cancel the estimated received signal of the PBCH of the stronger cell. To decode the data, for example when using SFBC/STBC diversity schemes, the receiver assumes the channel is the same across the group of resource elements involved in the SFBC/STBC scheme. Once the data is decoded, to estimate the channel corresponding to one transmit antenna port, the UE first tries to cancel the contribution from the second antenna port using the channel estimate obtained from the reference signal. Similarly, the UE estimates the channel for the second antenna port cancelling the signal from the first antenna port using the channel estimate from the reference signal. At this point, the UE has channel estimates from data which it could use to cancel the signal completely.

In additional aspects, a first round of cancellation uses the channel estimates from the reference signal. Additional rounds may be repeated using channel estimates obtained from the decoded data.

In still further additional aspects, another iterative process may begin with the UE using the original signal to cancel the first antenna port signal using channel estimates derived from the reference signal. The UE then obtains a data-based channel estimate for the second antenna port. Again from the original signal, the second antenna port signal is cancelled using estimates from the reference signal and the UE then obtains another data-based channel estimate for the first antenna port. The first antenna port signal is canceled from the original signal using channel estimates based on data. With that, a better data-based channel estimate is obtained for the second antenna port. From the original signal, the UE cancels the second antenna port signal using estimates based on data. Again, a better data-based channel estimate is obtained for the first antenna port. These last two steps may be repeated until a sufficient cancellation quality is achieved.

Another aspect of the signal cancellation includes cancellation of the first antenna signal using channel estimates from the reference signal. From the cancelled signal, data for the second antenna port is used to obtain a channel estimate. From the original signal, the UE cancels the second antenna port signal using the data-based channel estimate. From the cancelled signal, the UE obtains a channel estimate using data for the first antenna port. Again from the original signal, the UE cancels the first antenna port signal using the data-based channel. The steps that do not utilize channel estimates from the reference signal are repeated a number of times until an adequate cancellation quality is achieved.

FIG. 6 is a functional block diagram illustrating an example method 601 for enhancing overage in a heterogeneous wireless network. In block 610, a reference signal is generated indicated the number of transmit antenna ports at a base station. In block 612, modulation symbols for the indicated antenna ports are generated. The base station assigns the generated modulation symbols to the antenna ports in accordance with a spatial diversity transmission scheme. At least one of the modulation symbols assigned to an antenna port is muted prior to transmission in accordance with the spatial diversity scheme, in block 614. The non-muted modulation symbols and the reference signal are then transmitted on the other antenna port(s) in block 616.

The functional blocks and modules in FIG. 6 may comprise processors, electronics devices, hardware devices, electronics components, logical circuits, memories, software codes, firmware codes, etc., or any combination thereof.

In one configuration, the eNodeB 110 is configured for wireless communication including means for generating a reference signal. In one aspect, the generating means may be the controller/processor 440, transmit processor 420 and/or TX MIMO processor 430 configured to perform the functions recited by the generating means. The eNodeB 110 is also configured to include a means for generating modulation symbols. In one aspect, the means for generating modulation symbols may be the controller/processor 440 and/or the transmit processor 420 configured to perform the functions recited by the generating means. The eNodeB 110 is also configured to include a means for muting. In one aspect, the muting means may be the controller/processor 480 and the modulators 432a-432t configured to perform the functions recited by the muting means. The eNodeB 110 is also configured to include a means for transmitting. In one aspect, the transmitting means may be the TX MIMO processor 430 configured to perform the functions recited by the transmitting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method to enhance coverage in a heterogeneous wireless network, the method comprising:
   generating a reference signal indicating a plurality of transmit antenna ports;
   generating modulation symbols;
   assigning the modulation symbols to each of the plurality of transmit antenna ports, in accordance with a spatial diversity coding scheme for the plurality of transmit antenna ports;
   muting, by adjusting at least one of the modulation symbols assigned to a first subset of the plurality of transmit antenna ports to zero transmission power, prior to transmission in accordance with the spatial diversity coding scheme; and
   transmitting non-muted modulation symbols and the reference signal on a second subset of the plurality of transmit antenna ports.

2. The method of claim 1, in which the muting is performed by a first eNodeB on detecting a user equipment (UE) within a coverage area of the first eNodeB, the UE in communication with a second eNodeB, in which downlink signals from the first eNodeB interfere with communication signals between the UE and the second eNodeB.

3. The method of claim 1, in which the reference signal comprises a common reference signal (CRS).

4. The method of claim 1, in which the transmitting non-muted modulation symbols further comprises transmitting in a PBCH (physical broadcast channel) region.

5. The method of claim 1, further comprising signaling a muting pattern to at least one user equipment (UE).

6. The method of claim 1, in which the muted modulation symbols change across at least one of time and frequency.

7. The method of claim 6, in which the same muting pattern is used for all SFBC/SFBC-FSTD (space frequency block code/space frequency block code-frequency shift time diversity) groups in a same resource block.

8. The method of claim 1, further comprising applying a power boost to non-muted modulation symbols based on power assigned to the muted modulation symbols.

9. The method of claim 1, further comprising:
   receiving an indication that the spatial diversity transmission scheme for an eNodeB has been modified; and
   decoding data based on the modified spatial diversity scheme.

10. An apparatus for wireless communication, comprising:
    a memory; and
    at least one processor coupled to the memory, the at least one processor being configured:
       to generate a reference signal indicating a plurality of transmit antenna ports;
       to generate modulation symbols;
       to assign the modulation symbols to each of the plurality of transmit antenna ports, in accordance with a spatial diversity coding scheme for the plurality of transmit antenna ports;
       to mute, by adjusting at least one of the modulation symbols assigned to a first subset of the plurality of transmit antenna ports to zero transmission power, prior to transmission in accordance with the spatial diversity coding scheme; and
       to transmit non-muted modulation symbols and the reference signal on a second subset of the plurality of transmit antenna ports.

11. The apparatus of claim 10, in which the processor configured to mute is performed at a first eNodeB on detecting a user equipment (UE) within a coverage area of the first eNodeB, the UE in communication with a second eNodeB, in which downlink signals from the first eNodeB interfere with communication signals between the UE and the second eNodeB.

12. The apparatus of claim 10, in which the reference signal comprises a common reference signal (CRS).

13. The apparatus of claim 10, in which the processor configured to transmit is further configured to transmit in a PBCH (physical broadcast channel) region.

14. The apparatus of claim 10, in which the processor is further configured to signal a muting pattern to at least one user equipment (UE).

15. The apparatus of claim 10, in which the muted modulation symbols change across at least one of time and frequency.

16. The apparatus of claim 15, in which the same muting pattern is used for all SFBC/SFBC-FSTD (space frequency block code/space frequency block code-frequency shift time diversity) groups in a same resource block.

17. The apparatus of claim 10, the processor further configured to apply a power boost to non-muted modulation symbols based on power assigned to the muted modulation symbols.

18. The apparatus of claim 10, the processor further configured:
    to receive an indication that the spatial diversity transmission scheme for an eNodeB has been modified; and
    to decode data based on the modified spatial diversity scheme.

19. A computer program product for wireless communication in a wireless network, comprising:
    a non-transitory computer-readable medium having program code recorded thereon, the program code comprising:
       program code to generate a reference signal indicating a plurality of transmit antenna ports;
       program code to generate modulation symbols;
       program code to assign the modulation symbols to each of the plurality of transmit antenna ports, in accordance with a spatial diversity coding scheme for the plurality of transmit antenna ports;
       program code to mute, by adjusting a first subset of the modulation symbols assigned to at least one of the plurality of transmit antenna ports to zero transmission power, prior to transmission in accordance with the spatial diversity coding scheme; and program code to transmit non-muted modulation symbols and the reference signal on a second subset of the plurality of transmit antenna ports.

20. An apparatus for wireless communication, comprising:

means for generating a reference signal indicating a plurality of transmit antenna ports;

means for generating modulation symbols;

means for assigning the modulation symbols to each of the plurality of transmit antenna ports, in accordance with a spatial diversity coding scheme for the plurality of transmit antenna ports;

means for muting, by adjusting at least one of the modulation symbols assigned to a first subset of the plurality of transmit antenna ports to zero transmission power, prior to transmission in accordance with the spatial diversity coding scheme; and means for transmitting non-muted modulation symbols and the reference signal on a second subset of the plurality of transmit antenna ports.

\* \* \* \* \*